United States Patent [19]

Hayakawa et al.

[11] Patent Number: 5,019,025
[45] Date of Patent: May 28, 1991

[54] CARRIER DEVICE IN AN AUTOMATIC TRANSMISSION

[75] Inventors: Youichi Hayakawa, Toyoake; Chihiro Hosono; Masaaki Nishida, both of Anjo, all of Japan

[73] Assignee: Aisin AW Co., Ltd., Anjo, Japan

[21] Appl. No.: 293,251

[22] Filed: Jan. 4, 1989

[30] Foreign Application Priority Data

Aug. 11, 1988 [JP] Japan ................ 63-201399

[51] Int. Cl.$^5$ ............................................. F16H 1/28
[52] U.S. Cl. ...................................... 475/285; 475/284
[58] Field of Search ............... 74/750 R, 760, 761, 74/762, 467; 475/284, 285

[56] References Cited

U.S. PATENT DOCUMENTS

| | | | |
|---|---|---|---|
| 2,248,240 | 7/1941 | King ............................. | 74/750 R |
| 2,418,455 | 4/1947 | Banker ....................... | 475/284 X |
| 3,147,642 | 9/1964 | Erwin ........................... | 74/750 R |
| 3,233,478 | 2/1966 | General et al. ............ | 475/285 X |
| 4,123,952 | 11/1978 | Wayman ..................... | 475/285 X |
| 4,721,014 | 1/1988 | Ohkubo ...................... | 74/750 R |

FOREIGN PATENT DOCUMENTS

329199 5/1930 United Kingdom .
484296 5/1938 United Kingdom .
530421 12/1940 United Kingdom .
676055 7/1952 United Kingdom .
1216057 12/1970 United Kingdom .

*Primary Examiner*—Allan D. Herrmann
*Assistant Examiner*—Khoi Q. Ta
*Attorney, Agent, or Firm*—Kanesaka and Takeuchi

[57] ABSTRACT

A carrier is provided with a flange-shaped carrier cover directly secured to a pinion shaft which supports a pinion, and the carrier cover is integrally formed to a countershaft by heat forging. The carrier cover is formed with a lubricant oil hole extending from the countershaft toward the pinion shaft, and the countershaft is formed with a small diameter on the side bounded by the carrier cover where the planetary gear unit is positioned, and with a large diameter on the opposite side. As a result, the countershaft has a high degree of strength and forms a compact gear unit in the axial direction. Lubricant is supplied from a lubricant oil hole in the center of the shaft to a lubricant oil hole formed in the carrier cover, and is forcedly fed to the support surface of the pinion through oil holes in the pinion shaft. The axial force from the counterdriven gear is applied to a thrust bearing between the hub and the carrier cover, and the axial force is backed up by the large diameter section of the shaft.

3 Claims, 4 Drawing Sheets

FIG. 3

|  |  | MAIN TRANSMISSION MECHANISM 11 | | | | | | | UNDER DRIVE MECHANISM 3 | | |
|---|---|---|---|---|---|---|---|---|---|---|---|
|  |  | C1 | C2 | B1 | B2 | B3 | F1 | F2 | C3 | B4 | F3 |
| P | | | | | | | | | | ○ | |
| R | | | ○ | | | ○ | | | | ○ | |
| N | | | | | | | | | | ○ | |
| D | 1 | ○ | | | | | | ○ | | ○ | ○ |
|  | 2 | ○ | | (○) | ○ | | ○ | | | ○ | ○ |
|  | 3 | ○ | | (○) | ○ | | ○ | | ○ | | |
|  | 4 | ○ | ○ | | ○ | | | | ○ | | |
| 3 | 1 | ○ | | | | | | ○ | | ○ | ○ |
|  | 2 | ○ | | ○ | ○ | | ○ | | | ○ | ○ |
|  | 3 | ○ | | ○ | ○ | | ○ | | ○ | | |
| 2 | 1 | ○ | | | | | | ○ | | ○ | ○ |
|  | 2 | ○ | | ○ | ○ | | ○ | | | ○ | ○ |
| 1 | 1 | ○ | | | | ○ | | ○ | | ○ | ○ |
|  | 2 | ○ | | ○ | ○ | | ○ | | | ○ | ○ |

CARRIER DEVICE IN AN AUTOMATIC TRANSMISSION

BACKGROUND OF THE INVENTION

1. Field of the Invention

The present invention relates to a carrier device in an automatic transmission, and, in particular, to a carrier device suitable for application as a carrier for an underdrive mechanism section in an automatic transmission used in a FF (Front Engine/Front Drive) vehicle wherein the underdrive mechanism section is positioned on a countershaft.

2. Description of the Prior Art

Recently, the applicant of the present invention proposed an automatic transmission, as disclosed in Japanese Laid Open Patent No. SHO-62-93546, which comprises a torque converter and a main transmission mechanism section arranged on an input shaft which is aligned on an engine crank shaft, an underdrive mechanism section arranged on a countershaft positioned in parallel on the input shaft, and a counterdrive gear and a counterdriven gear mounted on the center part in the axial direction to transmit power from the main transmission mechanism section to the underdrive mechanism section.

The underdrive mechanism section of the automatic transmission (additional transmission section) has a carrier boss section which engages on the countershaft through a spline, and the counterdriven gear is supported on the carrier boss section through a bearing. Also, the countershaft is provided with an annular protrusion which receives a thrust force and is constructed with almost the same diameter over its entire length. A large thrust force which is caused by the counterdriven gear comprising a helical gear is received only at the annular protrusion.

However, in the automatic transmission, the countershaft is positioned on the highest portion of three shafts, including the input shaft and the front axle shaft, and the dimension in the axial direction is largely controlled by the restraints from the vehicle load such as the side frame and the like. Because the carrier is separated from the countershaft, the dimension in the axial direction is large, and a problem arises in the loadability of the vehicle.

In addition, because the carrier is separated from the countershaft, it is difficult to supply the lubrication oil to the carrier cover from the shaft, and the supply of oil to the planetary gear is inadequate. This causes a problem with the durability of the planetary gear.

Further, because the large axial force from the counterdriven gear and the like is received only on the annular protrusion on the countershaft, a problem is produced with respect to the strength of the annular protrusion part. If the annular protrusion is thickened the increase in length in the axial direction becomes a problem.

SUMMARY OF THE INVENTION

An object of the present invention is to provide, with due consideration to the drawbacks of such conventional devices, a carrier support device in an automatic transmission wherein a carrier is formed integrally with the shaft.

This object is achieved in the present invention by an automatic transmission A comprising a planetary gear unit (1) mounted on a shaft (2) and having a carrier (CR3) to support a pinion (P3), wherein the carrier (CR3) is provided with a flange-shaped carrier cover (6), to which a pinion shaft (5) supporting a pinion (P3) is secured, the carrier cover (6) is integrally formed on a shaft (2), a lubricant oiling hole (6a) is formed from the shaft (2) toward the pinion shaft (5) in the carrier cover (6), and, the shaft (2) comprises a small diameter section (2a) a large diameter section (2b) with the carrier cover (6) therebetween such that the small diameter section (2a) is formed on the side on which the planetary gear unit is mounted and the large diameter section (2b) on the other side.

As an example, the automatic transmission mechanism is an underdrive mechanism section (3) and the shaft is the countershaft (2) mounted in parallel with the input shaft (10).

As a result of the above structure, for example, rotation from the counterdriven gear (13) is transmitted to a ring gear (R3) on the planetary gear unit (1), and also transmitted to the shaft (2) through the carrier (CR3). At this time, the rotation is directly transmitted through the connection of a sun gear (S3) and the carrier (CR3) based on a direct clutch (C3). The underdrive rotation is transmitted by restraining the sun gear S3 by means of an underdrive brake (B4) or a one-way clutch (F3).

The flange-shaped carrier cover (6) is integrally formed on the shaft (2) by hot forging. The pinion shaft (5) is directly secured to the cover (6). The gear unit (1) is fabricated to have high strength and a compact configuration in the axial direction. Lubricant is supplied to a lubricant oil hole (6a) formed in the carrier cover (6) from a central lubricating hole (2c) in the shaft (2), and is forcedly fed to the support surface of the pinion (P3) through oil holes (5a), (5b) in the pinion shaft (5). The axial force from the counterdriven gear (13) is applied to a thrust bearing (15) between a sun gear boss section (17) and the carrier cover (6), and the axial force is backed up by the large diameter section (2b) of the shaft (2).

Incidentally, the reference numerals in the parentheses are used only for reference with the drawings and do not limit the structure of the invention. The same number may be named differently in the following description and in the previous description in which broader concepts are adopted.

BRIEF DESCRIPTION OF THE DRAWINGS

FIG. 3 is an illustration showing the operation of the automatic transmission of FIG. 2.

DETAILED DESCRIPTION OF THE PREFERRED EMBODIMENTS

An embodiment of the present invention will now be described with reference to the drawings.

Figure 2:
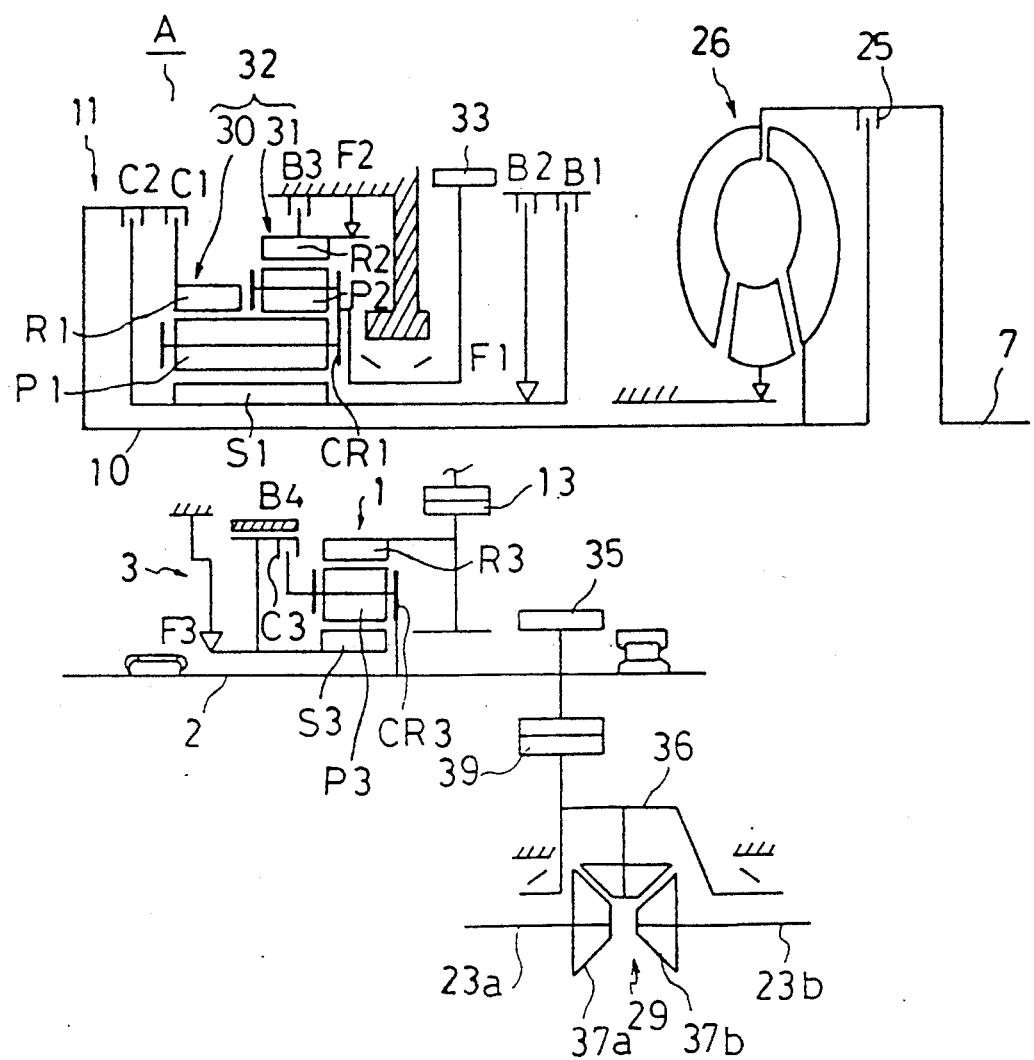
FIG. 2 is a schematic view of an automatic transmission to which the present invention is applied.

Now referring to FIG. 2, an automatic transmission A applicable to the present invention comprises three shafts, that is an input shaft 10 aligned with an engine crank shaft 7, a counter shaft 2, and a front axle shaft formed of shafts 23a, 23b. A main automatic transmission mechanism section 11 and a torque converter 26 with a lockup clutch 25 are supported on the input shaft 10, and an under-drive mechanism section 3 is supported on the counter shaft 2. A front differential device 29 is supported on the front axle shafts 23a, 23b.

The main automatic transmission mechanism section 11 comprises a planetary gear unit 32 assembled from a single planetary gear 30 and a dual planetary gear 31. In the planetary gear unit 32, sun gears of the two planetary gears and carriers are integrally linked to form a common sun gear S1 and a common carrier CR1, respectively, and in addition, a long pinion P1 is engaged with the sun gear S1. The input shaft 10 and a ring gear R1 of the single planetary gear 30 are linked through a first (forward) clutch C1, and the input gear 10 and the sun gear S1 are linked through a second (reverse and direct) clutch C2. The sun gear S1 is directly engaged with and stopped by the first brake B1, and prevented from rotating in one direction by means of the second brake B2 through a first one-way clutch F1. A ring gear R2 of the dual planetary gear 31 is directly engaged with and stopped by a third brake B3, and prevented from rotating in one direction by a second one-way clutch F2. The carrier CR1 is linked to a counter drive gear 33 which is supported on the casing bulkhead. The gear 33 is an output member of the main automatic transmission mechanism section 11.

The under-drive mechanism section 3 has a single planetary gear 1. The sun gear S3 and a carrier CR3 of the planetary gear 1 are linked to each other through a third (direct) clutch C3. In addition, the sun gear S3 is directly engaged with and stopped by a fourth (under-drive) brake B4, and is prevented from rotating in one direction by means of a one-way clutch F3. The ring gear R3 engages the counter drive gear 33 and is linked to a counter-driven gear 13 which is the input member of the under-drive mechanism section 3. The carrier CR3 is linked to the counter shaft 2. A reducing gear 35 which is the output member of the under-drive mechanism section 3 is secured to the counter shaft 2.

The front differential device 29 comprises a differential carrier 36 and a pair of left and right sun gears 37a, 37b. A ring gear 39 is secured to a gear mounting casing which forms the differential carrier 36. The ring gear 39 engages the reducing gear 35 to complete the speed reducing mechanism. The left and right gears 37a, 37b are linked to the left and right front axle shafts 23a, 23b respectively.

The operation of the automatic transmission A will now be explained with reference to FIG. 3.

Rotation of the engine crank shaft 7 is transmitted to the input shaft 10 through the torque converter 26 or the lockup clutch 25. In the first speed status in the D range, the first clutch C1 is placed in an engaged state, and the fourth brake B4 is in a stopped state. In this stauts, in the main automatic transmission mechanism section 11, rotation of the input shaft 10 is transmitted to the ring gear R1 of the single planetary gear 30 through the first clutch C1, and the ring gear R2 of the dual planetary gear 31 is prevented from rotating by the second one-way clutch F2, so that while the sun gear S1 is idling in the reverse direction, the common carrier CR1 is caused to rotate at a greatly reduced speed in the forward direction, and rotation is produced through the counter drive gear 33. In the under-drive mechanism section 3, the sun gear S3 is stopped by means of the fourth brake B4 and the third one-way clutch F3, so that the rotation from the counterdriven gear 13 is produced as a reduced speed rotation in the carrier CR3 from the ring gear R3. Accordingly, the first speed rotation of the main automatic transmission mechanism section 11 and the reduced speed rotation of the under-drive mechanism section 3 are combined, and the rotation is transmitted to the front differential device 29 through the reducing gear 35 and the ring gear 39, and is then transmitted to the left and right front axle shafts 23a, 23b.

In the second speed status in the D range, the second brake B2 is activated in addition to the connection of the first clutch C1 and the action of the fourth brake B4. Whereupon the rotation of the sun gear S1 is halted from the action of the first one-way clutch F1 based on the brake B2. Accordingly, with the rotation of the first ring gear R1 through the input shaft 10, while the ring gear R2 of the dual planetary gear 31 is being idled in the forward direction, the carrier CR1 rotates with reduced speed in the forward direction, and the rotation is produced as the second speed in the counter drive gear 33. The under-drive mechanism section 3 remains unchanged at reduced speed. The second speed of the main automatic transmission mechanism section 11 is combined with the reduced rotation of the under-drive mechanism section 3, and the resulting rotation is transmitted to the front axle shafts 23a, 23b.

In the third speed status in the D range, the main automatic transmission mechanism section 11 maintains the second speed status without change, and when the fourth brake B4 in the under-drive mechanism section 3 is released, the third clutch C3 is placed in engagement. Whereupon the carrier CR3 and the side gear S3 become connected to each other, and the planetary gear 1 rotates as one unit to produce direct rotation in the counter shaft 2. At this time, the fourth brake B4 is released a little before the engagement of the third clutch C3 and shifting is made by the third one-way clutch F3 by preventing transmission from becoming impossible. Accordingly, the second speed rotation of the main automatic transmission mechanism section 11 and the direct rotation of the under-drive mechanism section 3 are combined, and the third speed is obtained as a whole in the automatic transmission A.

When shifting down to the second or third gear in the D range, the first brake B1 is also activated, so that the engine acts as a brake when coasting.

The fourth speed status in the D range is obtained from the third speed status with the second clutch C2 placed in engagement. Whereupon, rotation is transmitted to the ring gear R1 through the first clutch C1 from the input shaft 10, and to the sun gear S1 through the second clutch C2. The planetary gear unit 32 rotates integrally, and rotation is directly transmitted to the counterdriven gear 33. Then, the directly connected rotation of the main automatic transmission mechanism section 11 and the directly connected rotation of the under-drive mechanism section 3 are combined, and the counter drive gear 33 and the driven gear 13 are in a prescribed acceleration relationship, so that the entire automatic transmission A is subjected to overdrive rotation. At this time, in case the first brake B1 is activated in the second and third speeds, when an upshift is made to the fourth speed, the first brake B1 is activated a little ahead of time, so that while the sun gear S1 is being stopped by the one-way clutch F1, the second clutch C2 is engaged, and shift shock by means of interchange is prevented.

In addition, the third range is the same as the status where the first brake B1 is activated during the application of the second and third speeds in the previously mentioned D range having the first, second and third speeds.

Also, the second range is the same as the first and second speed status in the above third range.

In the first speed status in the first range, in addition to the engagement of the first clutch C1 and the action of the fourth brake B4, the third brake B3 is activated. In this status, the ring gear R2 is stopped by the second one-way clutch F2 and the third brake B3 without regard to the direction of rotation, so that the engine brake is activated. In addition, the second speed status is the same as the second speed status in the second range.

In the reverse range, the second clutch C2 is engaged, and at the same time, the third brake B3 and the fourth brake B4 are activated. In this status, the rotation of the input shaft 10 is transmitted to the sun gear S1 through the second clutch C2. Also in this status, the ring gear R2 of the dual planetary gear 31 is secured by the action of the third brake B3, so that while the ring gear R1 of the single planetary gear 30 is made to rotate in reverse, the carrier CR1 also rotates in reverse, and the reverse rotation of the carrier is produced at the counter drive gear 33. Further, the speed of the reverse rotation of the counter drive gear 33 is reduced by the under-drive mechanism section 3 and is transmitted to the front axle shafts 23a and 23b.

Figure 4:
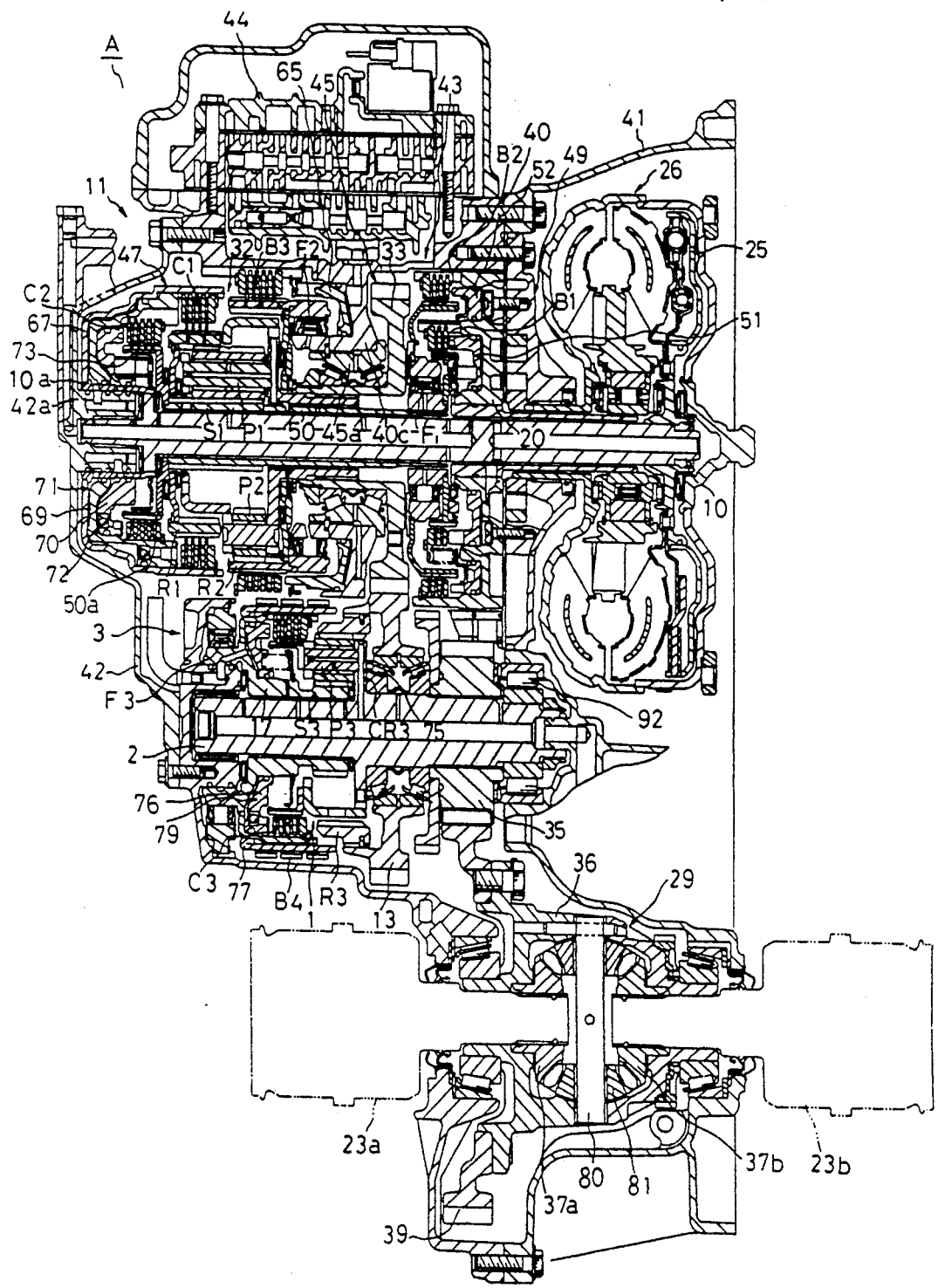
FIG. 4 is a cross sectional view generally showing the automatic transmission of FIG. 2.

Next, an explanation will be given to the automatic transmission A by means of a specific embodiment with reference to FIG. 4.

The automatic transmission A has an integral casing apparatus comprising a transaxle casing 40, a transaxle housing 41, and a rear cover 42. The input shaft 10, the counter shaft 2, and the ring gear mounting casing 36 which is differential carrier of the front differential device 29 are free rotationally supported in the casing apparatus. Then, the torque converter 26 which has a lockup clutch 25, and the main automatic transmission mechanism section 11 are positioned on the input shaft 10. The under-drive mechanism section 3 is positioned on the counter shaft 2. In addition, a valve body 44 is positioned on the transaxle casing 40.

In the main automatic transmission mechanism section 11, a brake section 43, an output section 45, the planetary gear unit 32, and a clutch section 47 are arranged in order in the axial direction from the engine crank shaft 7 to the rear. An oil pump 49 is positioned between the brake 43 and the torque converter 26. A hollow shaft 50 is situated over and free rotationally supported by the input shaft 10.

The planetary gear unit 32 comprises the single planetary gear 30 and the dual planetary gear 31, as shown in FIG. 2. The single planetary gear 30 comprises the sun gear S1 formed on the hollow shaft 50, the ring gar R1, and the carrier CR1 which supports the pinion P1 which engages the ring gear R1 and the sun gear S1. The dual planetary gear 31 comprises the sun gear S1 formed on the hollow shaft 50, the ring gear R2, and the carrier CR1 which supports the first pinion P1 and the second pinion P2 to mutually engage together, wherein the first pinion P1 is engaged with the sun gear S1, and the second pinion P2 is engaged with the ring gear R2. Both the planetary gears 30, 31 have a common single gear with the same number of teeth that is the sun gear S1 on the hollow shaft 50. The carrier CR is integrally formed, and the pinion P1 is formed by an integral long pinion.

The first one-way clutch F1, the first brake B1 comprising a multiplate brake and the second brake B2 comprising a multiplate brake are arranged in the brake section 43 in order from the radially inner side to the radially outer direction. The hydraulic actuator 51 is secured to the cover of the oil pump 49 at a position adjacent to the first brake B1, while the hydraulic actuator 52 is secured to the cover of the oil pump 49 at a position adjacent to the second brake B2. The hydraulic actuator 51 and the hydraulic actuator 52 are juxtaposed radially. The first brake B1 is secured to the hollow shaft 50, to which the inner race of the one-way clutch F1 is also connected. The inner race of the one-way clutch F1 is connected to the second brake B2.

The output section 45 is provided with the counter-drive gear 33 positioned at almost dead center of the main automatic transmission mechanism section 11. The counter drive gear 33 is free rotationally supported on the bulkhead 6c formed in the transaxle casing 40 through a double tapered bearing 45a. The counter drive gear 33 has a boss section which is connected to the carrier CR1 of the planetary gear unit 32. The outer race of the bearing 45a is engaged by a spline to the inner peripheral surface of the casing bulkhead 40c, and the second one-way clutch F2 is mounted on the outer peripheral surface of the race extension section.

The clutch section 47 is provided with the first (forward) clutch C1 and the second (direct) clutch C2 and is positioned at the rear edge of the main automatic transmission mechanism section 11 and housed in the rear cover 42. In addition, the rear edge section of the input shaft 10 forms the sleeve section 10a by which the boss section 42a of the cover 42 is engaged. In addition, a clutch drum 67 is integrally linked to the sleeve section 10a. A movable member 69 is engaged to freely slide only in the axial direction on the clutch drum 67 by means of a spline. A piston member 70 is fitted with the movable member 69. In addition, the movable member 69 defines an oil chamber cooperating with the cylinder which is an inner peripheral surface of the clutch drum 67, thereby forming a hydraulic actuator 71 for use with the first clutch. A piston member 70 defines an oil chamber cooperating with the cylinder which is an inner peripheral surface of the movable member 69, thereby forming a hydraulic actuator 72 for use with the second clutch C2. Set between the piston member 70 and the snap ring secured to the sleeve 10a is a spring 73 which is compressed through a receiving member. The spring 73 forms a return spring which is common to the piston members 69, 70 of the hydraulic actuators 71, 72. In addition, the first clutch C1 is interposed between the spline formed on the inner peripheral surface of the radially outer section of the clutch drum 67 and the spline formed on the outer peripheral surface of the ring gear R1. The second clutch C2 is interposed between the spline formed on the inner peripheral surface of the radially outer section of the movable section 69 and the spline formed on the outer peripheral surface of the hub section 50a secured to the hollow shaft 50.

Figure 1:
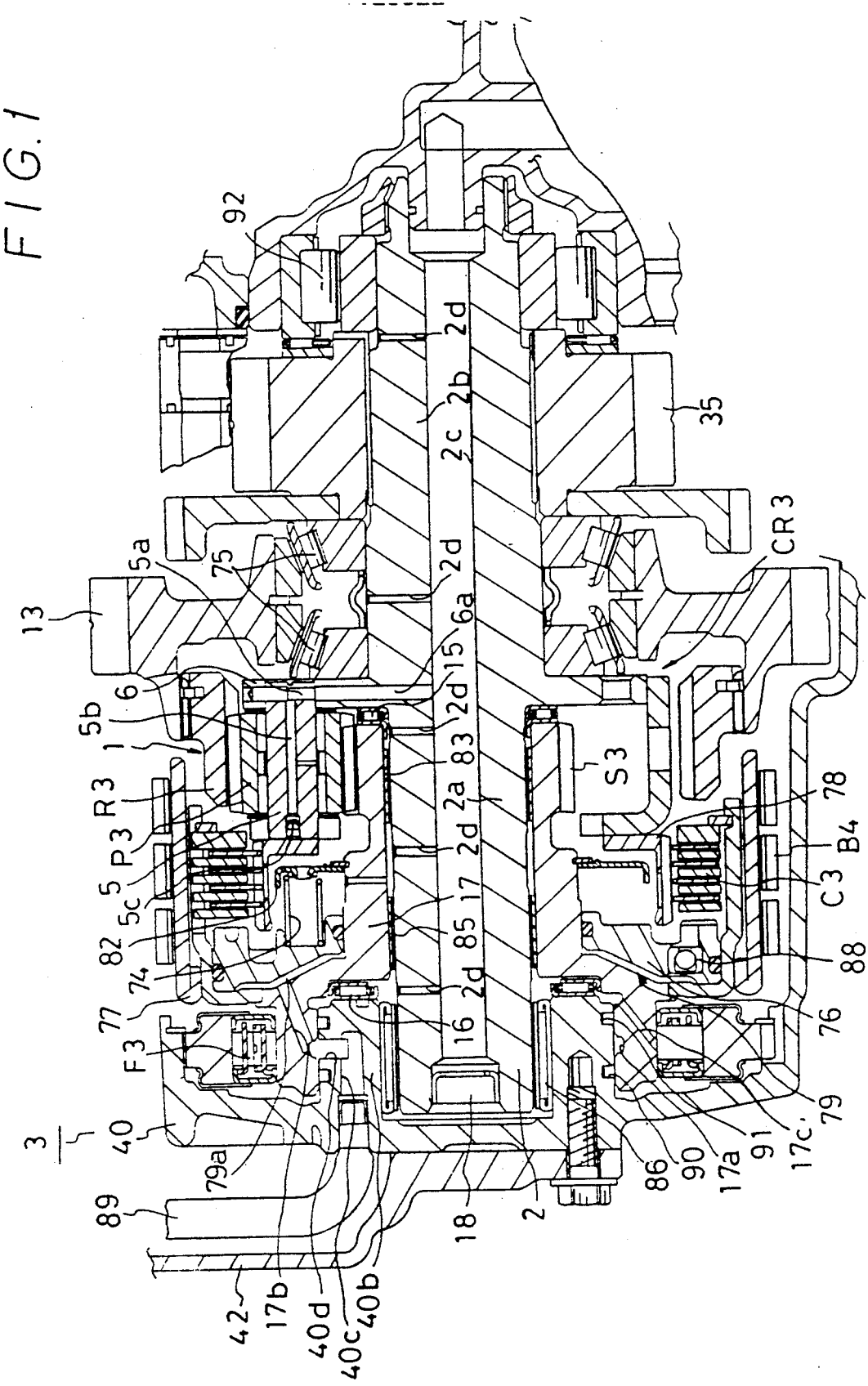
FIG. 1 is a cross sectional view showing a carrier device according to the present invention.

The under-drive mechanism section 3 is provided with one single planetary gear 1, as shown in FIG. 1. Also, the counter driven gear 13 which is a helical gear is free rotationally supported on the counter shaft 2 through a bearing 75, and the reducing gear 35 is secured to the counter shaft 2. The counter shaft 2 has its both ends rotatably supported by bearings 86, 92 and set in the transaxle casing 40. The ring gear R3 of the planetary gear 1 is linked to the counterdriven gear 13. The carrier CR3 which supports the pinion P3 is integrally formed with the counter shaft 2 by enlarging in the radially outer direction. The sun gear S3 is formed on a hub 17 which is free rotationally supported by bushings 83, 85 on the shaft 2. A drum 77 secured to the radially outer section of the hub is engaged on its outer peripheral surface with the fourth (under-drive) brake B4 which is a hand brake. The third (direct) clutch C3 is interposed between the inner peripheral surface of the drum 77 and the hub secured to the carrier CR3. A piston 76 engages the hub 17 adjacent to the clutch C3 and forms a hydraulic actuator 79 for the clutch C3. The hydraulic actuator 79 has an oil chamber 79a in a space defined by the piston 76, drum 77 and the hub 17.

In addition, a check valve 88 which eliminates the centrifugal pressure of the oil when rotating is installed in the piston member 76. A spring 74 is compressedly inserted between the piston member 76 and a ring 82 fastened to the hub 17, and acts as a return spring for the piston member 76. A boss section 40b is formed on the end section of a transaxle casing 40. The countershaft 2 is free rotationally supported on the boss section 40b through the bearing 86. In addition, a lubricating hole 2c is formed in the center section of the countershaft 2. A cross-hole 2d is formed in the radial direction of the shaft 2, and a plug 18 is installed in the end of the lubricating hole 2c. This structure allows lubrication at suitable locations. An extension part of the hub 17 is engaged with the outer peripheral surface of the boss section 40b. This extension part forms the inner race of a third one-way clutch F3. This third one-way clutch F3 is positioned between the inner race and the transaxle casing 40. An oil channel 17c formed in the hub 17 is connected to the one-way clutch F3. The one-way clutch F3 is suitably lubricated by oil supplied from the oil hole 2d. A rear cover 42 is secured by a bolt to the side surface of the transaxle casing 40. As shown in FIG. 5, a pipe 89 through which pressurized oil is supplied from a valve body 44 is provided on the inner surface of the rear cover 42. The pipe 89 is formed in such a way to supply pressurized oil to an oil chamber 79a of a hydraulic actuator 79 through an oil channel 40c formed in the boss section 40b, an oil hole 40d, an annular oil groove 17a formed in the hub 17, and an oil channel 17b which extends at an angle from the bottom of the oil groove. Seal grooves 90, 91 are formed close to and on both sides of the annular oil groove 17a. A seal ring is inserted in this groove and prevents oil leakage when the oil is fed under pressure.

The carrier CR3 is provided with the carrier cover 6 and the carrier cover 6 is formed integrally with the countershaft 2 by hot forging. The countershaft 2 comprises a small diameter section 2a and a large diameter section 2b with the carrier cover 6 therebetween as a boundary. the small diameter section 2a is formed on the side on which the planetary gear unit is mounted and a large diameter section 2b on the other side. The pinion shaft 5 is directly secured to the cover 6. A lubricating oil hole 5b is formed in the center section of the pinion shaft, and a lubricant oil hole 5a is formed in the axial direction on the side end section of the carrier cover 6 of the pinion shaft 5. A plug 5c is installed in the end of the oil hole 5b to prevent leakage of the lubricant. The lubricant oil hole 5a is connected to the lubricant oil hole 6a formed in the carrier cover 6. The oil hole 6a is directly connected to the lubricant oil hole 2c formed in the center section of the countershaft 2.

The front differential device 29 is provided with the ring gear mounting casing 36 which forms a differential carrier. The casing 36 is free rotationally supported on the housing 41 and casing 40 through a bearing. The large diameter ring gear 39 which engages the reducing gear 35 is secured to the mounting casing 36. In its inner section, a pinion gear 81 is free rotationally supported by a pinion shaft 80, and the right and left side gears 37a, 37b which engage the gear 81 are free rotationally supported. A pair of right and left front axle shafts 23a, 23b are respectively engaged and linked by the side gears 37a, 37b.

As a result of this structure of the present invention, a suitably speed-adjusted rotation is transmitted from the counterdriven gear 13 in the main transmission mechanism section 11 to the underdrive mechanism section 3. In D-range, 1-range, 2-range, and 3-range, when first speed and second speed are used, the sun gear S3 is halted by a fourth (under-drive) brake B4 and the third one-way clutch F3, the speed of rotation of the underdrive mechanism section 3 is reduced and the clutch F3 is isolated from the carrier CR3. This reduced speed rotation is matched by a suitably changed rotation in the main transmission mechanism section 11 and is transmitted to the front differential device 29.

In addition, the third (direct) clutch C3 is engaged in the third and fourth speeds. Specifically, the hydraulic pressure for the clutch C3 system is supplied from the valve body 44 through the pipe 89 to the oil channel 40c. Also, the hydraulic pressure for engaging the third clutch C3 passes from the oil channel 40c through the oil hole 40d, the annular oil groove 17a, and through the oil hole 17b to supply the oil chamber 79a in the hydraulic actuator 79, and the third (direct) clutch C3 is engaged. In this status, the fourth (underdrive) brake B4 is disengaged, and based on the engagement of the third (direct) clutch C3, the carrier CR3 and the sun gear S3 rotate integrally, and direct rotation results. This direct rotation matches the suitably changed rotation in the main transmission mechanism section and is transmitted to the front differential device 29.

At this time, the lubricant from the lubricant oil hole 2c is supplied directly to the oiling hole 6a of the carrier cover 6, and reaches the oil holes 5a, 5b of the pinion shaft 5 and forcedly lubricates the support surface of the pinion P3. As a result, the pinion P3 is always properly lubricated.

In addition, the counterdriven gear 13, which is a helical gear, develops an axial force by the rotation, and this axial force acts on the hub 17 and the thrust bearings 15, 16, and is borne by the boss section 40b of the transaxle casing 40. On the other hand, the reaction to this axial force is backed up by the large diameter section 2b of the countershaft, and the underdrive mechanism section 3 is always maintained in a proper stress status.

TECHNICAL ADVANTAGES OF THE INVENTION

As explained above, by means of the present invention, because the carrier cover (6) is integrally formed on the shaft (2), and the shaft (2) can be made very compact in the axial direction, so that while still maintaining a high degree of rigidity, the loadability of the vehicle is improved. In addition, based on the integral form of the carrier cover (6), the lubricant oil hole (6a) can be formed in the cover, and, as a result, it is possible to forcedly lubricate the planetary gear unit (1). Its durability can therefore be improved. In addition, the axial force produced in the counterdriven gear (13) can be backed up by the large diameter section (2b) of the shaft (2), and the shaft (2) has a high rigidity.

In addition, when the automatic transmission mechanism section is the overdrive mechanism section (3) on the shaft (2), positioned on the highest part of the automatic transmission (A), it is possible to remove the severe restraints on the vehicle loading.

What is claimed is:

1. A carrier device in an automatic transmission comprising,
   - a planetary gear unit having a carrier with a carrier cover in the form of a flange, said carrier cover having a first lubricating oil hole extending in the radial direction thereof, a pinion shaft secured to the carrier cover and having a second lubricating oil hole extending in the longitudinal direction of the pinion shaft and communicating with the first lubricating oil hole, and a pinion rotationally situated on the pinion shaft, and
   - a shaft integrally formed with the carrier cover so that the carrier cover extends radially outwardly from the shaft, said shaft being divided by the carrier cover into a small diameter section and a large diameter section larger than the small diameter section and having a third lubricating oil hole therein extending in the longitudinal direction thereof and communicating with the first lubricating oil hole, said shaft being adapted to support power transmission means at the large diameter section and the planetary gear unit having a rotatably mounted sun gear at the small diameter section, oil being forcibly supplied under pressure to the pinion through the first, second and third lubricating oil holes.

2. A carrier device in an automatic transmission according to claim 1, wherein the automatic transmission includes a main transmission section having an input shaft and an underdrive mechanism section, said shaft being a counter-shaft parallel to the input shaft of the main transmission, and said carrier and shaft forming the underdrive mechanism section.

3. A carrier device in an automatic transmission according to claim 2, wherein the power transmission means situated on the large diameter section are a counterdriven gear for transmitting power to the planetary gear unit and a reducing gear for transmitting power from the shaft.

* * * * *